United States Patent

Hatakeyama

(10) Patent No.: US 9,511,506 B2
(45) Date of Patent: Dec. 6, 2016

(54) FUSION CUTTING DEVICE

(71) Applicant: Kiyoshi Hatakeyama, Yokosuka (JP)

(72) Inventor: Kiyoshi Hatakeyama, Yokosuka (JP)

(73) Assignee: JAPAN AGENCY FOR MARINE-EARTH SCIENCE AND TECHNOLOGY, Yokosuka-Shi (JP)

( * ) Notice: Subject to any disclaimer, the term of this patent is extended or adjusted under 35 U.S.C. 154(b) by 387 days.

(21) Appl. No.: 14/349,819

(22) PCT Filed: Oct. 5, 2012

(86) PCT No.: PCT/JP2012/076036
§ 371 (c)(1),
(2) Date: Jun. 26, 2014

(87) PCT Pub. No.: WO2013/051719
PCT Pub. Date: Apr. 11, 2013

(65) Prior Publication Data
US 2014/0374459 A1 Dec. 25, 2014

(30) Foreign Application Priority Data

Oct. 6, 2011 (JP) .................................. 2011-221880

(51) Int. Cl.
*B26F 3/08* (2006.01)
*G01V 1/18* (2006.01)
(Continued)

(52) U.S. Cl.
CPC . *B26F 3/08* (2013.01); *B26D 3/16* (2013.01); *B26F 3/12* (2013.01); *B63B 22/06* (2013.01);
(Continued)

(58) Field of Classification Search
None
See application file for complete search history.

(56) References Cited

U.S. PATENT DOCUMENTS 3,353,849 A * 11/1967 Laurizio ................ B65D 39/08
220/288
4,256,945 A * 3/1981 Carter ...................... H05B 3/42
219/229
(Continued)

FOREIGN PATENT DOCUMENTS

JP 63-191918 8/1988
JP 08-271291 10/1996
(Continued)

OTHER PUBLICATIONS

International Search Report, Date of mailing: Dec. 25, 2012 (Dec. 25, 2012).

*Primary Examiner* — Joseph M Pelham
(74) *Attorney, Agent, or Firm* — Rankin, Hill & Clark LLP

(57) ABSTRACT

A fusion cutting device includes a fusion cutting device body made from a connecting-member enclosure in the shape of a tube, for slidably passing a connecting member therethrough, an electric heater wound outside the connecting-member enclosure in the form of a coil, and a case configured to contain these connecting-member enclosure and electric heater, a power source for supplying electric current to the electric heater, and a switch circuit configured to flow the electric current from the power source to the electric heater. The first object and the second object are fixed by the connecting member. When the switch circuit turns on, electric current flows from the power source to the electric heater, thereby fusion cutting the connecting-member enclosure and the connecting member that pass through the connecting-member enclosure. The first object and the second object are thereby separated.

4 Claims, 8 Drawing Sheets

(51) Int. Cl.
   *G01V 1/38*    (2006.01)
   *B63B 22/06*   (2006.01)
   *B63C 11/00*   (2006.01)
   *B64B 1/40*    (2006.01)
   *H05B 3/06*    (2006.01)
   *B26D 3/16*    (2006.01)
   *B26F 3/12*    (2006.01)
   *B26D 5/08*    (2006.01)

(52) U.S. Cl.
   CPC ............. *G01V 1/3852* (2013.01); *B26D 5/086* (2013.01); *B63B 2209/00* (2013.01); *H05B 3/06* (2013.01); *Y10T 225/30* (2015.04)

(56) References Cited

U.S. PATENT DOCUMENTS

| | | | | |
|---|---|---|---|---|
| 4,695,335 A | * | 9/1987 | Lyall | B29C 65/342 138/155 |
| 4,695,713 A | * | 9/1987 | Krumme | B23K 3/0475 219/233 |
| 4,701,587 A | * | 10/1987 | Carter | B23K 3/0475 219/233 |
| 4,745,264 A | * | 5/1988 | Carter | B23K 3/0475 219/229 |
| 4,814,587 A | * | 3/1989 | Carter | H05B 3/12 174/126.2 |
| 5,304,767 A | * | 4/1994 | McGaffigan | H05B 6/065 219/674 |
| 5,328,210 A | * | 7/1994 | Stafford | B29C 65/3432 285/21.2 |
| 5,338,920 A | * | 8/1994 | Okusaka | B29C 47/023 156/274.2 |
| 5,386,101 A | * | 1/1995 | Steinmetz | B29C 65/342 156/304.2 |
| 5,462,314 A | * | 10/1995 | Goto | B29C 65/3612 285/21.2 |
| 5,475,203 A | * | 12/1995 | McGaffigan | B29C 65/344 219/545 |
| 5,505,898 A | * | 4/1996 | Goto | B29C 45/14598 219/535 |
| 5,600,862 A | * | 2/1997 | Bleske | B08B 9/021 15/104.04 |
| 5,618,065 A | * | 4/1997 | Akiyama | B29C 45/1671 156/294 |
| 5,710,413 A | * | 1/1998 | King | B29C 66/80 156/272.4 |
| 5,916,468 A | * | 6/1999 | Akiyama | B29C 45/14549 219/535 |
| 5,975,587 A | * | 11/1999 | Wood | F16L 37/092 156/158 |
| 6,229,122 B1 | * | 5/2001 | Assen | B29C 65/3432 156/273.5 |
| 6,406,063 B1 | * | 6/2002 | Pfeiffer | B29C 65/342 285/21.2 |
| 6,870,143 B2 | * | 3/2005 | Martinez | F16L 55/17 138/171 |
| 6,883,835 B2 | * | 4/2005 | Krout | F16L 55/1683 138/97 |
| 7,204,520 B2 | * | 4/2007 | Mueller | B29C 66/73921 156/304.2 |
| 8,991,830 B2 | * | 3/2015 | Douglass, III | F16J 15/027 277/602 |
| 9,322,495 B2 | * | 4/2016 | Duncan | B29C 66/52291 |

FOREIGN PATENT DOCUMENTS

| | | |
|---|---|---|
| JP | 09-196710 | 7/1997 |
| JP | 2006-030124 | 2/2006 |

* cited by examiner

FUSION CUTTING DEVICE

TECHNICAL FIELD

The present invention relates to a fusion cutting device that may be used as a separation mechanism configured to release a fixed positional relationship between a first object and a second object.

BACKGROUND ART

A separation mechanism for separating a first object and a second object that are in a fixed positional relationship has conventionally been known. There is provided an OBS (Ocean Bottom Seismograph), for example, configured to be installed on a sea floor or at the bottom of the ocean to carry out measurement in order to conduct a seismic survey by sinking the OBS to the bottom of the ocean. In a seismic refraction survey to be conducted to study a mechanism of occurrence of an earthquake at the bottom of the ocean or the like, an artificial seismic wave is generated, and the sound wave refracted at a boundary surface between respective strata under the ocean bottom is received by a large number of ocean bottom seismographs installed at the bottom of the ocean at predetermined distances. Measurement is thereby carried out. The ocean seismograph thus used is formed by a combination of an ocean bottom seismograph body and an anchor (weight), and is sunk at the bottom of the ocean. The ocean seismograph body is the first object including therein a sensor and other parts and has buoyancy. The anchor (weight) is the second object for mooring the ocean seismograph body at the bottom of the ocean. After the measurement, a recovery operation of a body portion of the ocean seismograph is performed for data collection, device maintenance, or other purposes. The recovery operation is performed by operating the separation mechanism provided to separate the first object and the second object.

As the separation mechanism, there is a gunpowder method (disclosed in JP08-271291A (Patent Document 1)), an electric corrosion method (disclosed in JP2006-30124A (Patent Document 2)), etc. In the gunpowder method, an action of cutting a cable configured to connect the first object body and the second object is triggered by explosion of gunpowder. In the electric corrosion method, a metal plate (such as a stainless plate) or a metal wire, configured to connect the first object and the second object is electrically corroded forcibly to be cut. The first object and the second object are thereby separated.

PRIOR ART DOCUMENTS

Patent Documents

Patent Document 1: JP08-271291A
Patent Document 2: JP2006-30124A

SUMMARY OF INVENTION

Technical Problems

As to the gunpowder method, however, a structure for moving the separation mechanism is complex and large in size. Thus, the separation apparatus increases in weight and volume.

As to the electric corrosion method, it needs several minutes to ten several minutes to force the metal plate or the metal wire to be electrically corroded and to be cut. As one technical problem, when the separation mechanism is installed at the bottom of the ocean for a long period of time, the metal plate or the metal wire is subject to natural corrosion or a film is formed on the metal plate or the metal wire. The separation mechanism may not be thereby operated normally. As another technical problem, the method of electrically corroding the metal plate or the metal wire forcibly cannot be used in fresh water.

An object of the present invention is to provide a fusion cutting device that is compact, light, and does not have a complex mechanism, and may be used as a separation mechanism capable of separating a first object and a second object.

Another object of the present invention is to provide a fusion cutting device that may be used as a separation mechanism capable of separating a first body and a second body in a short period of time.

Still another object of the present invention is to provide a fusion cutting device that may be used as a separation mechanism whereby an operation of fixing a first object and a second object is facilitated.

A further object of the present invention is to provide a fusion cutting device that may be used as a separation mechanism capable of being operated even if the fusion cutting device is installed at the bottom of the ocean for a long period of time.

Solution to Problems

A fusion cutting device of the present invention is a device for fusion cutting a connecting member. The connecting member is formed of a thermoplastic material and operable to fix a positional relationship between a first object and a second object. The fusion cutting device is configured to separate the fixed relationship by fusion cutting the connecting member.

The fusion cutting device of the present invention comprises: a connecting-member enclosure configured to allow heat transfer to the connecting member and to slidably contain at least part of the connecting member; an electric heater disposed outside the connecting-member enclosure and configured to heat the at least part of the connecting member through the connecting-member enclosure; a power source for supplying electric current to the electric heater; and a power supply controller including a switch circuit configured to turn off until the power supply controller receives a fusion cutting command and to turn on to flow the electric current from the power source to the electric heater upon receipt of the fusion cutting command. When the power supply controller receives the fusion cutting command and turns on the switch circuit and then the electric current flows from the power source to the electric heater, the electric heater generates heat. The heat is transferred to the connecting member through the connecting-member enclosure, thereby fusion cutting the connecting member formed of the thermoplastic material. Fusion cutting of the connecting member separates the first object and the second object. Then, the power supply controller returns the switch circuit configured to flow the electric current from the power source to the electric heater to an off state, based on a physical change (e.g., change in a water pressure, an inclined angle, an acceleration, or an elapsed period of time) caused by separation of the first object and the second object or completion of counting of the time limit of a timer. In the case of an ocean bottom seismograph installed at the bottom of the ocean, for example, a body, which is the first object, and an anchor, which is the second object, are separated in accordance with the fusion cutting command. The body, which is the first object, thereby rises to the surface of the ocean.

In the present invention, the connecting member formed of the thermoplastic material is fusion cut by heat generation by the electric heater. Thus, a complex mechanism is not necessary, and the first object and the second object may be separated in a short period of time (several seconds). In the present invention in particular, the connecting-member enclosure slidably contains the at least part of the connecting member. Thus, when the length of the connecting member is partially too short or long to establish the fixed positional relationship between the first object and the second object, adjustment of the length of the connecting member may be made. As a result, according to the present invention, an operation of connecting the first object and the second object through the connecting member is facilitated, and the fusion cutting device may be installed at a desired position of the connecting member. When the connecting member is fusion cut, the connecting member smoothly slips out of the connecting-member enclosure. Thus, the positional relationship between the first object and the second object may be reliably and smoothly released.

Further, a metal is not used for the connecting member, so that corrosion does not occur. Thus, even after the fusion cutting device has been installed under water for a long period, the first object and the second object may be reliably separated.

A thermoplastic resin, for example, is suitable as the thermoplastic material used for the connecting member. By appropriately selecting a resin material, sufficient strength for connecting the first object and the second object may be obtained. Further, the connecting member may be readily fusion cut by heat from the electric heater.

Any structure may be used for the connecting-member enclosure if the heat from the electric heater can be transferred to the connecting member. Any material that forms the connecting-member enclosure may be used if the material can transfer the heat from the electric heater to the connecting member. The connecting-member enclosure may be formed of a metal, for example. When the connecting-member enclosure is formed of the metal, however, it may take time to transfer heat to the connecting member so that the connecting member is fusion cut. Then, the connecting-member enclosure may be formed of a thermoplastic material having a melting point equal to or lower than the melting point of the thermoplastic material that forms the connecting member. Assume such a connecting-member enclosure is used. The connecting member is slidably contained until the fusion cutting command is received. When the fusion cutting command is received and then when the electric heater generates heat, the connecting-member enclosure is first melted. Then or almost simultaneously, the connecting member is melted. Accordingly, the first object and the second object may be separated in a short period of time.

Transmission of the fusion cutting command to the power supply controller may be by any means such as wireless transmission or wired transmission. When it is so arranged that the fusion cutting command may be wirelessly received, for example, transmission and reception of the fusion cutting command are facilitated even if a location of transmitting the fusion cutting command is remote from the first object and the second object.

The fusion cutting device of the present invention may be used for various purposes of use and may be used in various environments. To take an example, the fusion cutting device may be used as follows. The first object is a buoyant body having buoyancy and the second object is a weight configured to moor the buoyant body. The buoyant body and the weight are connected by a connection structure including a trigger mechanism configured to be released by release of a restraining force. The connecting member is used in the trigger mechanism such that the connecting member, which has not been fusion cut yet, generates the restraining force and the fusion cutting of the connecting member causes the restraining force to be released. An ocean bottom observation device or the like may be considered as an example of such usage. The ocean bottom observation device includes a measuring device in a part of a buoyant body thereof and is configured to be installed at the bottom of the ocean to carry out measurement. By operating the fusion cutting device in this ocean bottom observation device, the buoyant body may be recovered.

BRIEF DESCRIPTION OF DRAWINGS

FIG. 4A is a plan view and FIG. 4B is a front view.

DESCRIPTION OF EMBODIMENTS

Figure 1:
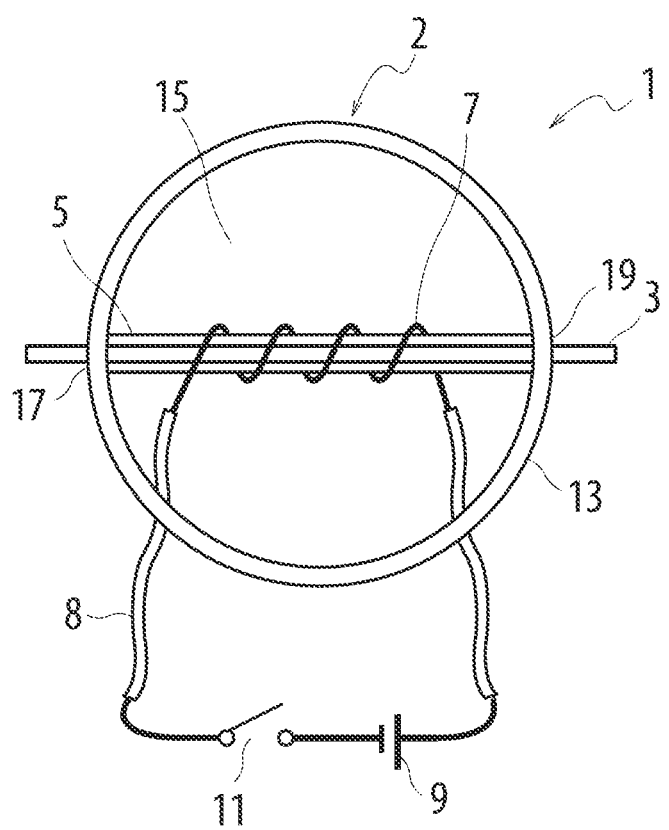
FIG. 1 is a diagram conceptually showing an example of a fusion cutting device of the present invention.
Figure 2:
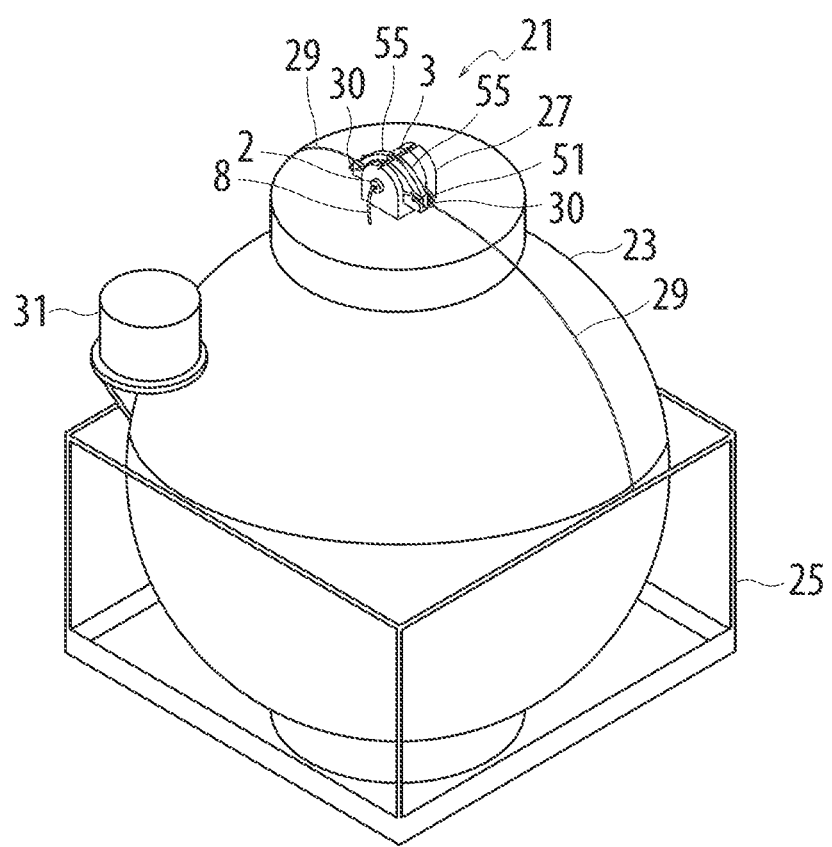
FIG. 2 is a diagram showing a whole observation device including a trigger mechanism to which the fusion cutting device of the present invention is applied.
Figure 3:
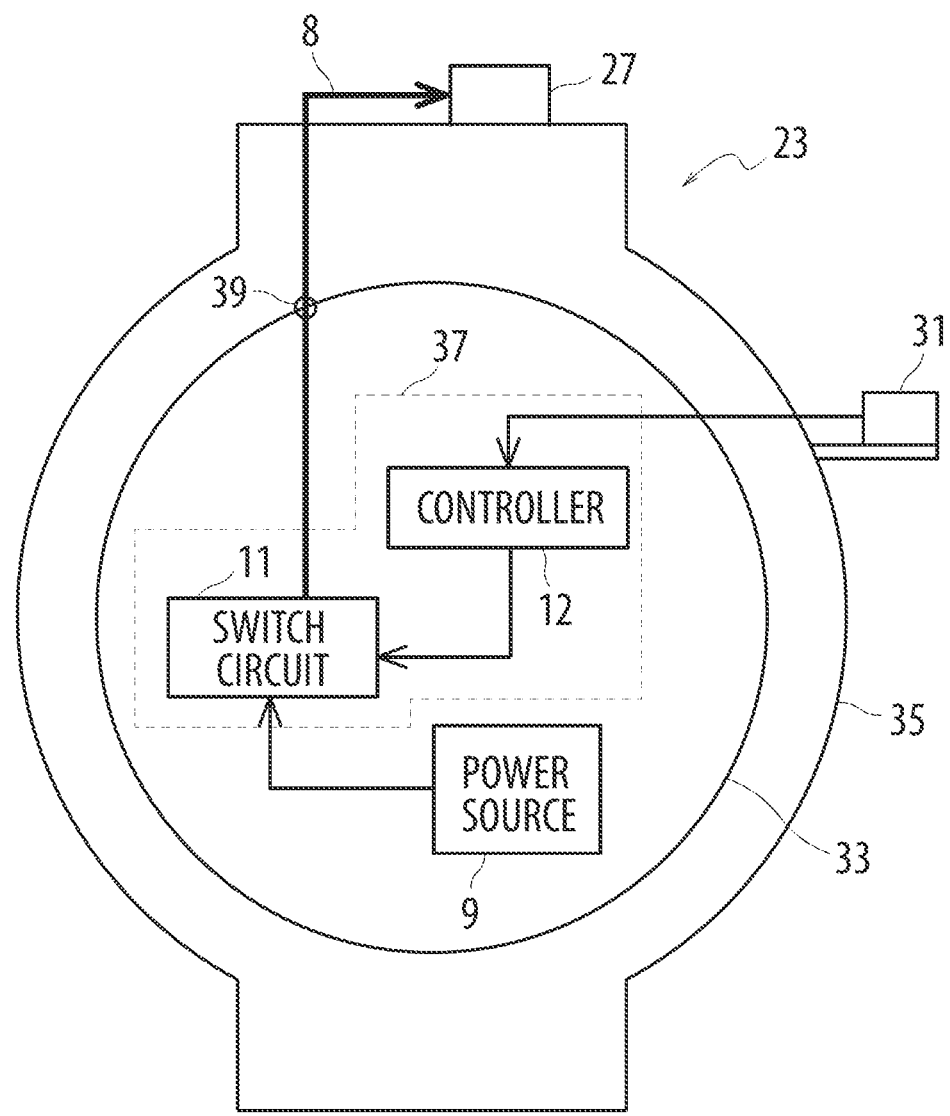
FIG. 3 is a block diagram showing a configuration of the observation device including the trigger mechanism to which the fusion cutting device of the present invention is applied.
Figure 4A:
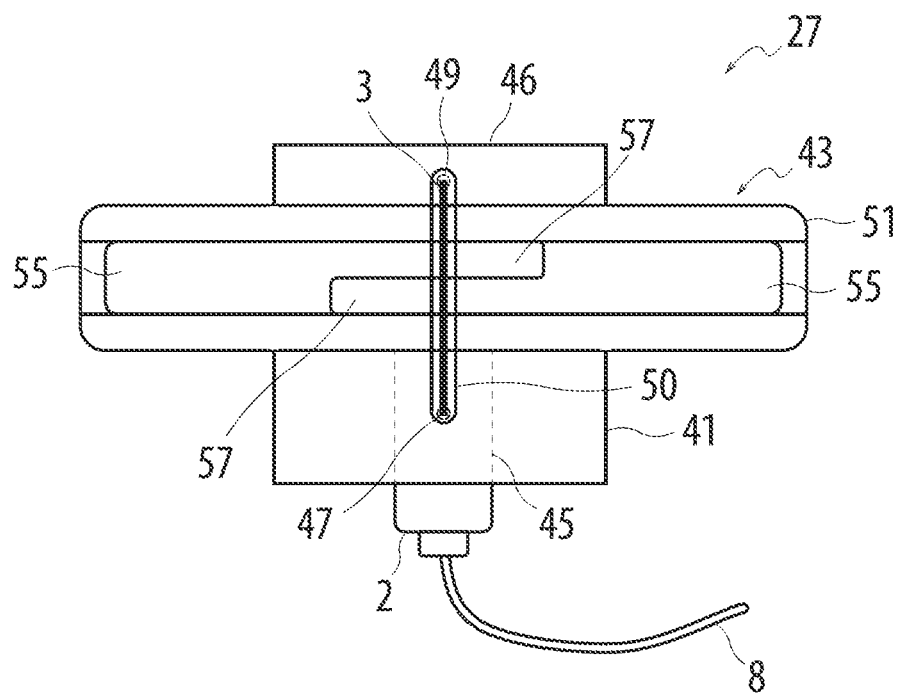
FIGS. 4A and 4B are diagrams showing an example trigger mechanism to which the fusion cutting device of the present invention is applied.
Figure 4B:
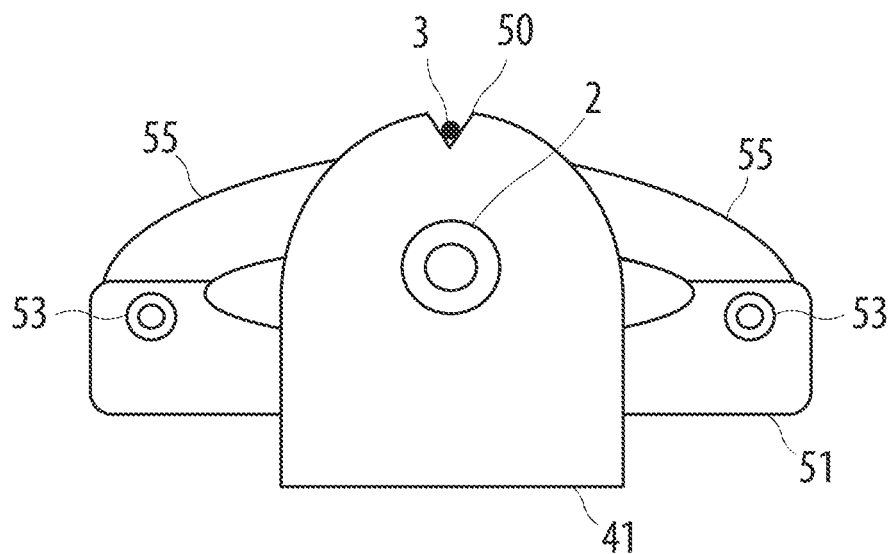
Figure 5:
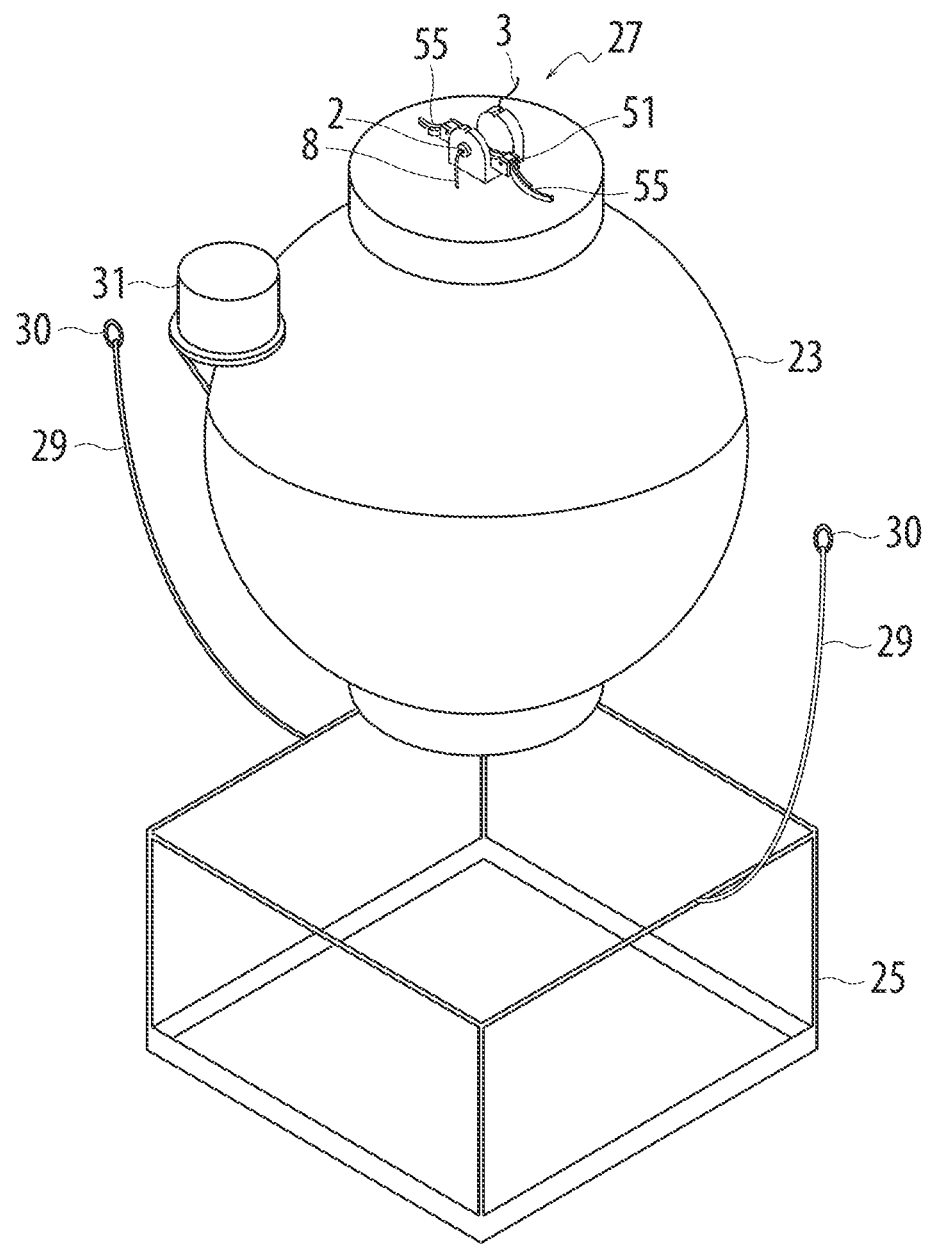
FIG. 5 is a diagram showing a state in which the trigger mechanism of the observation device has been operated, wherein the fusion cutting device of the present invention is applied to the trigger mechanism.

Embodiments of a fusion cutting device of the present invention will be described below with reference to the drawings. FIG. 1 conceptually shows an example fusion cutting device according to an embodiment of the present invention. FIG. 2 is a diagram showing a whole observation device including a trigger mechanism to which the fusion cutting device of the present invention is applied. FIG. 3 is a block diagram showing a configuration of the observation device including the trigger mechanism to which the fusion cutting device of the present invention is applied. FIGS. 4A and 4B show an example of the trigger mechanism to which the fusion cutting device of the present invention is applied. FIG. 5 is a diagram showing a state in which the trigger mechanism of the observation device has been operated, wherein the fusion cutting device of the present invention is applied to the trigger mechanism.

<Fusion Cutting Device>

As shown in FIG. 1, a fusion cutting device 1 in this embodiment includes a fusion cutting device body 2 comprising a connecting-member enclosure 5 in the shape of a tube configured to slidably pass a connecting member 3 therethrough, an electric heater 7 wound outside the connecting-member enclosure 5 in the form of a coil, and a case 13 configured to contain these connecting-member enclosure 5 and the electric heater 7, a power source 9 for supplying electric current to the electric heater 7, and a switch circuit 11 configured to flow the electric current from the power source 9 to the electric heater 7. The power source 9 is formed of a battery. The electric heater 7 and the power source 9 are electrically connected by a lead wire 8. Though a power supply controller is not illustrated in FIG. 1, the switch circuit 11 constitutes a part of the power supply controller, as will be described later. The connecting-member enclosure 5 and the electric heater 7 are contained inside the case 13, in this embodiment. Silicone rubber 15 is filled inside the case 13, and the case 13 is formed such that a water pressure to be applied to the electric heater 7 is even or equal and the case 13 is a waterproof structure. The silicone rubber 15 in FIG. 1 is depicted to be transparent so as to show the internal structure of the case 13. The case 13 is provided with holes 17 and 19 in opposite positions of the case 13. One end of the connecting-member enclosure 5 is aligned with the hole 17, and the other end of the connecting-member enclosure 5 is aligned with the hole 19, thereby forming in the case 13 a passage through which the connecting member 3 passes. The power source 9 and the switch circuit 11 (of the power supply controller) are provided outside the case 13, but are included inside a different component in which the fusion cutting device 1 is installed.

The connecting member 3 and the connecting-member enclosure 5 are each formed of a thermoplastic material, and are configured to be melted by means of heat generation of the electric heater 7. Assume that the connecting-member enclosure 5 is formed of the thermoplastic material having a melting point equal to or lower than the melting point of the thermoplastic material that forms the connecting member 3 (e.g., the connecting member 3 is formed of nylon, and the connecting-member enclosure 5 is formed of polypropylene). Then, when the electric heater 7 generates heat, the connecting-member enclosure 5 is first melted, and then, or almost simultaneously, the connecting member 3 is fusion cut.

The fusion cutting device is structured as follows: when the switch circuit 11 turns on, electric current flows from the power source 9 to the electric heater 7, thereby fusion cutting the connecting-member enclosure 5 and the connecting member 3 that passes through the connecting-member enclosure 5 by means of heat generation by the electric heater 7.

<Observation Device Including Trigger Mechanism to which Fusion Cutting Device is Applied>

FIGS. 2 and 3 show an example of an observation device 21 including the trigger mechanism to which the fusion cutting device of FIG. 1 is applied. The observation device 21 is a device configured to be installed at the bottom of the ocean to carry out measurements, and is an ocean bottom seismograph (OBS), for example. The observation device 21 includes an observation device body (which is the first object, namely a buoyant body) including a measuring device and other components and having buoyancy, an anchor 25 (which is the second object, namely a weight) configured to sink the observation device body 23 to the bottom of the ocean and moor the observation device body 23, a trigger mechanism 27 provided at an upper portion of the observation device body 23 and with the fusion device body 2 mounted thereto, two connection members 29, 29 configured to fix the observation device body 23 and the anchor 25 via the trigger mechanism 27, and a transducer 31 for receiving a fusion cutting command.

The observation device body 23 comprises a glass sphere 33 for withstanding a water pressure and protecting equipment included in the glass sphere 33 from water immersion, and a hard hat 35 configured to protect the glass sphere 33. In addition to the measuring device not shown, a component for operating the trigger mechanism 27 is included inside the glass sphere 33. That is, the power source 9 described above and a power supply controller 37 formed of the switch circuit 11 and a controller 12 are included inside the glass sphere 33. The power supply controller 37 is connected to the fusion cutting device body 2 mounted to the trigger mechanism 27 by the lead wire 8 through an underwater connecter 39 provided at the glass sphere 33, thereby forming the fusion cutting device 1. The observation device body 23 using the glass sphere 33 as a pressure resistant vessel is manufactured to be lighter than the weight of water corresponding to a drainage volume. Thus, the observation device body 3 has the buoyancy in the water. The anchor 25 is a heavy load formed of a metal or the like. Though not shown, metal fittings are fixed to the anchor 25 for mounting the connection members 29, 29 that will be described later.

The connection members 29, 29 are each a string-like member having stretchability or capable of being adjusted and fastened by appropriately setting the length thereof. Each connection member 29 has a structure as follows. That is, an engaging portion 30 in the shape of a ring is provided at one end of the connection member 29, and the engaging portion 30 may be put on an opening/closing mechanism of the trigger mechanism 27 that will be described later. Then, the other end of the connection member 29 is fixed to the anchor 25.

The trigger mechanism 27 is provided at a top portion of the hard hat 35 of the observation device body 23. By fixing the connection members 29, 29 to the anchor 25 in a stretched state such that the connection members 29 generate a tensile force centering on the trigger mechanism 27, the observation device body 23 and the anchor 25 establish a fixed positional relationship. When the transducer 31 receives a fusion cutting command and then the fusion cutting device 1 operates, the connecting member 3 is fusion cut, the connection members 29, 29 are released from the trigger mechanism 27, and then the observation device body 23 is released. This operation will be described later.

<Trigger Mechanism>

FIGS. 4A and 4B show an example of the trigger mechanism 27 to which the fusion cutting device body 2 of the fusion cutting device 1 is mounted. The trigger mechanism 27 comprises a trigger mechanism body 41 to which the fusion cutting device body 2 is mounted and an opening/closing mechanism 43 to which the engaging portions 30 (in FIG. 2) of the connection members 29 are mounted. The trigger mechanism body 41 has a hole 45 formed in a front side thereof for mounting the fusion cutting device body 2. In an upper portion of the trigger mechanism body 41, passage portions 47 and 49 for passing one end of the connecting member 3 therethrough are formed in two locations that sandwich the opening/closing mechanism 43. Notch portions 50 are also formed so as to guide the connecting member 3. The passage portion 47 passes from the upper portion to the hole 45, and the passage portion 49 extends to the vicinity of a connecting member fixing portion 46 provided at the backside of the opening/closing mechanism 43. Further, a passage portion (not shown) for passing the other end of the connecting member 3 therethrough is formed inside the trigger mechanism body 41. The starting point of the passage portion is located on the extended line of the passage portion 47 and inside the hole 45 and the end point of the passage portion is located in the vicinity of the connecting member fixing portion 46 provided at the backside of the opening/closing mechanism 43. The passage portion 47 and the passage portion not shown are formed at positions aligned with the positions of the holes 17 and 19 provided in the connecting-member enclosure 5 when the fusion cutting device body 2 is mounted in the holes 45 through the connecting member 3.

The opening/closing mechanism 43 is configured to be point-symmetrical with respect to the center of the opening/closing mechanism 43 in the plan view, and comprises an arm fixing portion 51 fixed to the trigger mechanism body 41 and arm portions 55 each configured to rotate with respect to a rotation shaft 53 provided at each end of the arm fixing portion 51. The arm portions 55 each have an engagement section 57 at a tip thereof. Then, the arm portions 55 are shaped to be engaged with each other when each arm portion 55 rotates in a direction toward the trigger mechanism body 41 and is then folded up, and have a length extending beyond positions of the passage portions 47 and 49.

<Fixation of Observation Device Body and Anchor>

Steps to fix the observation device body 23 and the anchor 25 are described below.

(1) The observation device body 23 is disposed at a position to be fixed to the anchor 25 (refer to FIG. 2). In this embodiment, the observation device body 23 is disposed within the frame of the anchor 25.

(2) The engaging portions 30, 30 of the connection members 29, 29 in the shape of a ring are respectively put on the arm portions 55, and then the arm portions 55, 55 are folded up in the direction toward the trigger mechanism body 41.

(3) The fusion cutting device body 2 and the connecting member 3 are mounted. One end of the connecting member 3 slidably contained in the connecting-member enclosure 5 of the fusion cutting device body 2 is passed through the passage portion 47 from the hole 45. The connecting member 3 is then pulled to pass over the engagement sections 57 of the arm portions 55 in the folded-up state, and is passed through the passage portion 49 to the connecting member fixing portion 46 at the backside of the opening/closing mechanism 43. Next, the other end of the connecting member 3 is passed through the passage portion (not shown) inside the hole 45 to the connecting member fixing portion 46 at the backside of the opening/closing mechanism 43. In this manner, the fusion cutting device body 2 is contained in the hole 45 such that the holes 17 and 19 of the connecting-member enclosure 5 are aligned with positions of the passage portion 47 and the passage portion not shown, when the one end and the other end of the connecting member 3 are passed inside the trigger mechanism body 41. The connecting member 3 is not fixed to anywhere at this point, and is slidably contained in the connecting-member enclosure 5. Thus, the length of the connecting member 3 can be adjusted, and occurrence of slackening may accordingly be prevented. Both ends of the connecting member 3 are finally fixed to the connecting member fixing portion 46 after adjustment of the connecting member 3. By restraining the engagement sections 57 by the connecting member 3, the arm portions 55, 55 are not rotated. Thus, the engaging portions 30, 30 of the connection members 29, 29 are restrained.

(4) The other end of each connection member 29 is fixed to the anchor 25, with the connection members 29, 29 linearly aligned and pulled to generate the tensile force.

The observation device body 23 is fixed to the anchor 25 according to the above-mentioned procedure. For example, the ocean bottom seismograph is transported to a measuring location by a ship after final preparations have been completed. Then, the ocean bottom seismograph is thrown into the ocean to be installed at the bottom of the ocean.

<Operation State of Trigger Mechanism>

When the observation device body 23 is recovered after completion of measurements or for maintenance of the measuring device, etc., the fusion cutting device 1 is operated according to the following procedure, thereby releasing the observation device body 23 from the anchor 25.

(1) A fusion cutting command is transmitted. The fusion cutting command is transmitted by a wireless transmitter on the ocean or from the ground, for example.

(2) When the transducer 31 receives the fusion cutting command, the controller 12 turns on the switch circuit 11.

(3) Direct electric current flows from the power source 9 to the electric heater 7, thereby fusion cutting the connecting-member enclosure 5 and the connecting member 3 by heat that has been generated.

(4) By fusion cutting of the connecting member 3, restraint of the engagement sections 57 is released. Each arm portion 55 is pulled outward to be opened by the tensile force of the connection members 29, 29. Then, the engaging portion 30 of each connection member 29 slips out of the arm portion 55 (as shown in FIG. 5).

(5) The observation device body 23 is released from the anchor 25. The observation device body 23 thereby comes up toward the surface of the ocean (as shown in FIG. 5).

(6) The power supply controller returns the switch circuit configured to flow the electric current from the power source to the electric heater to an off state, based on a physical change (e.g., change in a water pressure, an inclined angle, an acceleration, or an elapsed period of time) caused by separating the observation device body 23 and the anchor 25 or completion of counting of the time limit of a timer.

By transmitting the fusion cutting command according to the above-mentioned procedure, the observation device body 23 may be recovered in a short period of time and with reliability.

Figure 6:
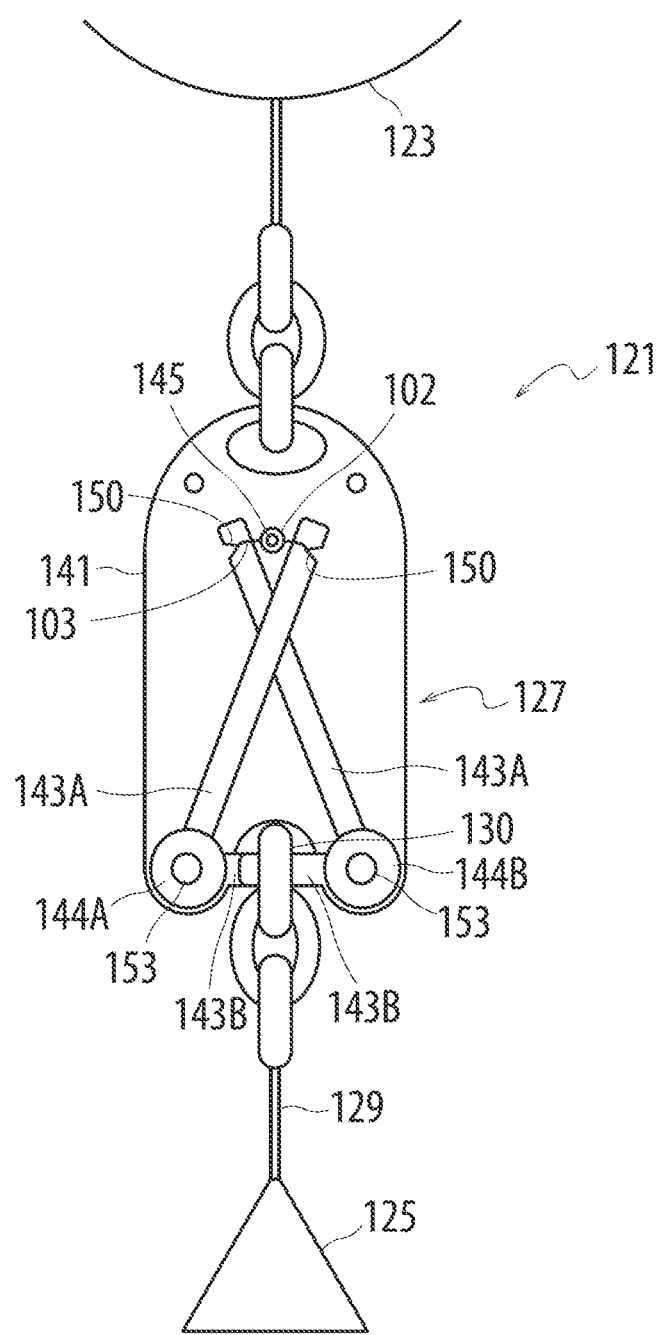
FIG. 6 is a diagram showing a whole observation device of a second embodiment, wherein the observation device includes a trigger mechanism to which a fusion cutting device of the present invention is applied.
Figure 7:
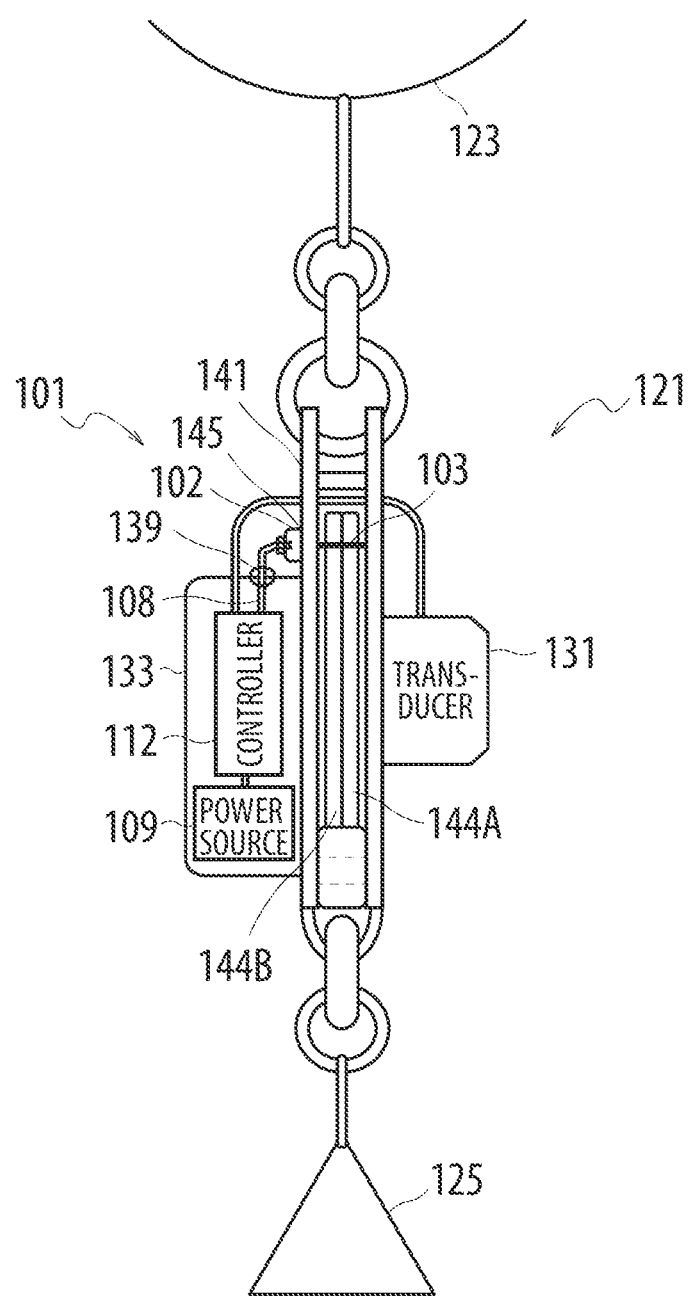
FIG. 7 is a block diagram showing a configuration of the observation device of the second embodiment wherein the observation device includes the trigger mechanism to which the fusion cutting device of the present invention is applied.
Figure 8:
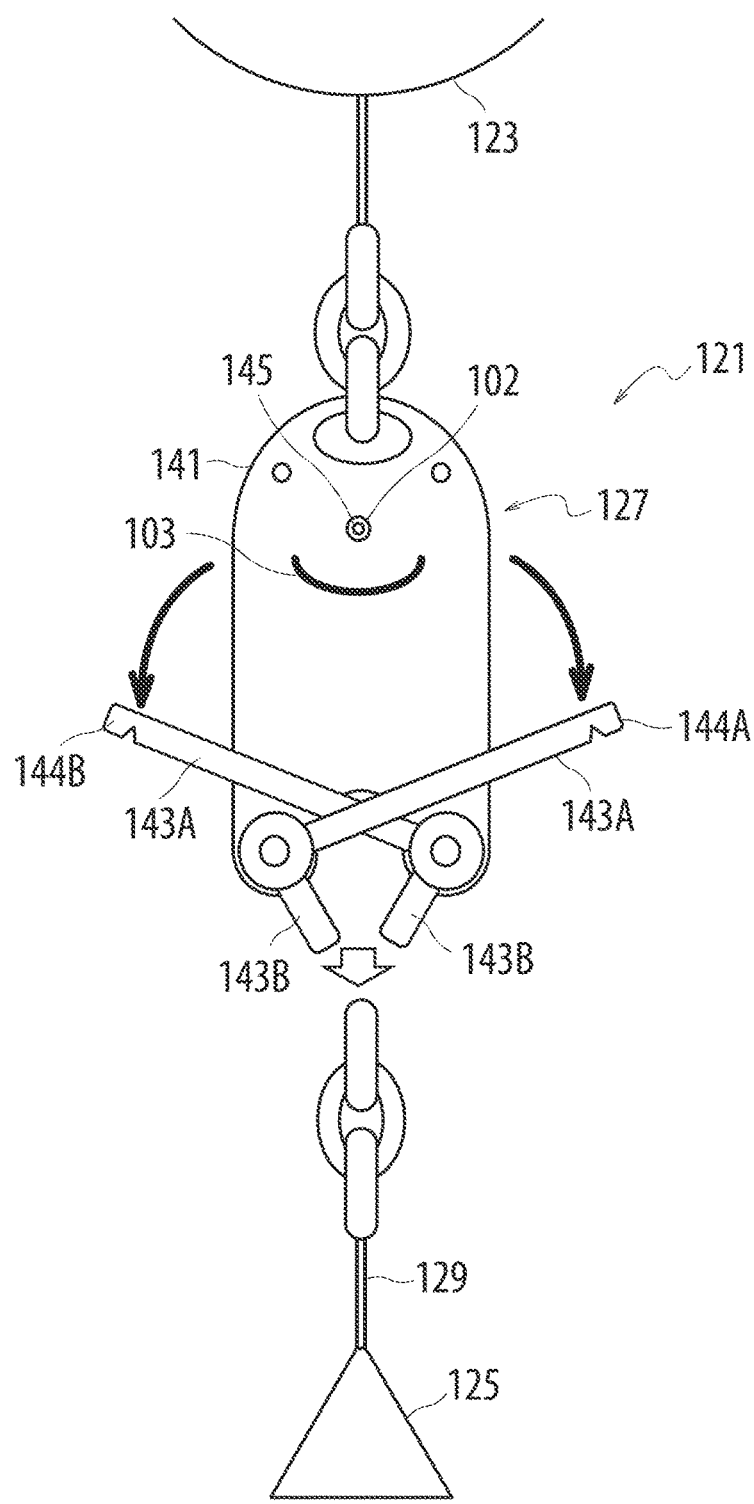
FIG. 8 is a diagram showing a state in which the trigger mechanism of the observation device of the second embodiment has been operated, wherein the fusion cutting device of the present invention is applied to the trigger mechanism.

The fusion cutting device in this embodiment may be applied to various types of separation mechanisms for separating a first body and a second body that are in a fixed positional relationship. FIGS. 6 to 8 each show an observation device of a second embodiment. Reference numerals obtained by adding 100 to the reference numerals of the parts in FIGS. 1 to 4 are allocated to counterparts in FIGS. 6 to 8. Description of the counterparts will be omitted.

FIG. 6 is a diagram showing a state where a cover is removed, for explanation. In the second embodiment as shown in FIG. 6, an observation device body 123 (illustration of an upper portion of the observation device body 123 is omitted) is fixed to an anchor 125 via a trigger mechanism 127. The trigger mechanism 127 of the second embodiment comprises a first link 144A and a second link 144B each including a long arm 143A and a short arm 143B. Two arms 143A and 143B configured to form each of the first link 144A and the second link 144B are each unitarily fixed to a bearing portion rotatably fitted around a rotation shaft 153, and an angle between the arm 143A and the arm 143B is set to be slightly smaller than 90 degrees. The first link 144A and the second link 144B are disposed to be shifted in an axial direction of the rotation shafts. Referring to FIG. 6 or FIG. 8, the long arm 143A and the short arm 143B of the first link 144A are positioned in front of the long arm 143A and the short arm 143B of the second link 144B. As a result, the first link 144A and the second link 144B do not interfere with each other.

A fusion cutting device 101 is mounted on the back side of a trigger mechanism body 141, and a power source 109 and a controller 112 are included inside a pressure resistant vessel 133, as shown in FIG. 7. A fusion cutting device body 102 is mounted in a through hole 145 formed in the trigger mechanism body 141 such that holes 117 and 119 of a case 113 are located on a side opposite to the side where the power source 109 and the controller 112 are included. A connecting member 103 is passed through the holes 117 and 119.

The anchor 125 and the trigger mechanism 127 are mounted as follows.

(1) The first link 144A and the second link 144B are rotated such that both of the short arms 143B, 143B of the first link 144A and the second link 144B pass through an engaging portion 130 of a connection member 129 in the shape of a ring that has been connected to the anchor 125. The first link 144A and the second link 144B are then stopped at a position where the short arms 143B, 143B overlap in a front-back direction of the page of each of FIGS. 6 and 8.

(2) End portions of the long arms 143A, 143A that are crossed each other are restrained by the connecting member 103 in the state described in item (1).

By fixing the anchor 125 and the trigger mechanism 127 in this manner, the first link 144A and the second link 144B, which will rotate by means of the weight of the anchor 125 (buoyancy of the observation device body 123 fixed by the anchor 125 in the water), may be stopped. The anchor 125 may be therefore fixed with respect to the observation device body 123. Further, end portions of the long arms 143A, 143A are restrained. Thus, rotation of the first link 144A and the second link 144B may be stopped by a small force according to the principle of a lever.

To recover the observation device body 123, the fusion cutting command is transmitted to the transducer 131. When the transducer 131 receives the fusion cutting command, the fusion cutting device 101 operates to fusion cut the connecting-member enclosure 105 and the connecting member 103, thereby releasing restraint of the first link 144A and the second link 144B. Each of the first link 144A and the second link 144B thereby rotates with respect to the rotation shaft 153. Then, the short arm 143B of the first link 144A and the short arm 143B of the second link 144B release the engaging portion 130 of the connection member 129 in the shape of the ring engaged with the anchor 125. The observation device body 123 thereby rises toward the surface of the ocean, together with the trigger mechanism 127 (as shown in FIG. 8).

The fusion cutting device of the present invention may also be used at a location other than locations underwater and in the ocean. The observation device body 123 of the second embodiment may be replaced by a balloon, and a portion of the anchor 125 may be replaced by a body portion including a measuring device, as a third embodiment, for example. In this case, by transmitting the fusion cutting command after the observation device has been flown in the air, the balloon may be separated to recover the body portion of the observation device. As a further example, the fusion cutting device of the present invention may be used as a separation mechanism for separating a weight installed on the ground and a balloon portion in order to remotely fly a radiosonde for meteorological investigation.

INDUSTRIAL APPLICABILITY

As described above, the fusion cutting device of the present invention is small and light and does not include a complex mechanism as the separation mechanism configured to separate the first object and the second object. Further, the connecting member is fusion cut by means of heat generation by the electric heater. Thus, the first object and the second object may be separated in a short period of time. Further, the first object and the second object can readily fixed. In addition, the fusion cutting device of the present invention has a structure that does not corrode even if the fusion cutting device is installed at the bottom of the ocean for a long period of time.

DESCRIPTION OF REFERENCE SYMBOLS 1 fusion cutting device
2 fusion cutting device body
3 connecting member
5 connecting-member enclosure
7 electric heater
8 lead wire
9 power source
11 switch circuit
12 controller
13 case
15 silicone rubber
17, 19 holes
21 observation device
23 observation device body
25 anchor
27 trigger mechanism
29, 29 connection members
30, 30 engaging portions
31 transducer
33 glass sphere
35 hard hat
37 power supply controller
39 waterproof connector
41 trigger mechanism body
43 opening/closing mechanism
45 hole
46 connecting-member fixing portion
47 passage portion
49 passage portion
50 notch portion
51 arm fixing portion
53, 53 rotation shafts
55, 55 arm portions
57, 57 engagement sections

The invention claimed is:
1. A connection structure including a trigger mechanism provided with a fusion cutting device for fusion cutting a connecting member formed of a thermoplastic material and operable to fix a positional relationship between a first object formed of a buoyant body and a second object formed of a weight configured to moor the buoyant body, the fusion cutting device being configured to release the fixed positional relationship by fusion cutting the connecting member, wherein:

the first object and the second object are connected by means of a restraining force generated by the connecting member which has not yet been fusion cut;

the fusion cutting device comprises:

a connecting-member enclosure configured to allow heat transfer to the connecting member and to slidably contain at least part of the connecting member;

an electric heater disposed outside the connecting-member enclosure and configured to heat the at least part of the connecting member through the connecting-member enclosure;

a power source for supplying electric current to the electric heater; and a power supply controller including a switch circuit configured to turn off until the power supply controller receives a fusion cutting command and to turn on to flow the electric current from the power source to the electric heater upon receipt of the fusion cutting command; and once the fusion cutting device is operated, the connecting member is fusion cut to release the restraining force, thereby releasing the fixed positional relationship between the first object and the second object.

2. The connection structure including the trigger mechanism provided with the fusion cutting device according to claim 1, wherein the thermoplastic material is a thermoplastic resin.

3. The connection structure including the trigger mechanism provided with the fusion cutting device according to claim 1, wherein the connecting-member enclosure is formed of a thermoplastic material having a melting point equal to or lower than a melting point of the thermoplastic material that forms the connecting member.

4. The connection structure including the trigger mechanism provided with the fusion cutting device according to claim 1, wherein the power supply controller is configured to wirelessly receive the fusion cutting command.

* * * * *